United States Patent
Katz

[19]

[11] Patent Number: 6,119,021
[45] Date of Patent: Sep. 12, 2000

[54] METHOD FOR THE OPERATION OF A CELLULAR MOBILE RADIO SYSTEM

[75] Inventor: Volkmar Scharf false Katz, Marstallstrasse, Germany

[73] Assignee: Detecon Deutsche Telepost Consulting GmbH, Boon, Germany

[21] Appl. No.: 09/047,614

[22] Filed: Mar. 25, 1998

[30] Foreign Application Priority Data

Aug. 21, 1997 [DE] Germany .................. 197 36 325

[51] Int. Cl.⁷ .................. H04B 7/00; H04M 3/42
[52] U.S. Cl. .................. 455/561; 455/414; 455/426; 455/466; 455/446
[58] Field of Search .................. 455/561, 525, 455/414, 434, 435, 426, 450–454, 466, 446, 449, 524

[56] References Cited

U.S. PATENT DOCUMENTS

| | | | |
|---|---|---|---|
| 5,613,213 | 3/1997 | Naddell et al. ............ | 455/414 |
| 5,724,664 | 3/1998 | Lantto ............ | 455/560 |
| 5,752,193 | 5/1998 | Scholefield et al. ............ | 455/452 |
| 5,930,241 | 7/1999 | Fried ............ | 370/328 |
| 5,974,322 | 10/1999 | Carlsson et al. ............ | 455/446 |
| 6,041,228 | 3/2000 | Niska et al. ............ | 455/419 |

*Primary Examiner*—Reinhard J. Eisenzopf
*Assistant Examiner*—Duc Nguyen
*Attorney, Agent, or Firm*—Cooper & Dunham LLP

[57] ABSTRACT

A method of operating a cellular mobile radio system with a plurality of radio cells each of which is supplied by one or more base stations, in which connection each base station regularly sends out system information which is received and evaluated by mobile stations present in the supply region of the base station to indicated which services are supported at the time by the corresponding base station. The invention is characterized by the fact that one or more base stations of selected radio cells send out additional system information which can be received by correspondingly developed mobile stations, and the mobile station determines from the system information and the additional system information whether a cell supports no services, exclusively the previous services, exclusively one or more additional services, or all services offered.

13 Claims, 1 Drawing Sheet

○ BASE STATION, SUPPORT "NORMAL" SERVICES ONLY

□ BASE STATION, SUPPORT GPRS ONLY

METHOD FOR THE OPERATION OF A CELLULAR MOBILE RADIO SYSTEM

FIELD OF THE INVENTION

The present invention relates to a method for the operation of a cellular mobile radio system.

DESCRIPTION OF THE RELATED ART

Mobile radio operators and system manufacturers are at present working on new services for The Global System for Mobile Communications (GSM) one of these services being, for instance, the data service General Packet Radio Service (GPRS). In this connection, it is provided that, for the provision of these new services, the existing GSM structure be utilized. This means that the network capacity—the supply and the offer—is divided between the new service and the other GSM services, for instance voice traffic. The frequencies or radio channels present are in principle used jointly by the new services and previous services, and therefore, for instance, voice traffic and/or GPRS is possible.

In various countries there are different cell structures of the GSM and therefore the capacity of many networks to offer additional services such as GPRS is limited, depending on the existing network structure.

The object of the invention is therefore to propose a method for operating a cellular mobile radio system in order to improve, in connection with the implementation of additional services, the traffic-dependent behavior of the mobile radio network and thus optimize the possible throughput.

SUMMARY OF THE INVENTION

This object is achieved by the methods indicated hereinafter.

The technical advantages which can be obtained are at least as follows.

In order that a distinction be made between base stations supporting the corresponding service and base stations not supporting it, there is a clear hierarchical network structure which makes it possible to manage the new service as a subordinate structure within the existing GSM network structure.

In this way, a dynamic traffic-load-related behavior can be realized which considerably increases the data throughput possible.

The network operator is now in a position to configure the network such that, for instance, dependence on the traffic load to be expected in a given cell or with a given base station supports only a given service and no longer supports other GSM services.

This, of course, has the advantage that practically the data throughput of the selected base stations is increased enormously since no service other than the one selected is supported and, on the other hand, that, depending on the management of the additional service, a base station control (BSC) is no longer necessary for the corresponding base station, since the base station can be connected directly to the corresponding control nodes of the additional service.

A change in the existing system components and the hardware of the GSM network is not necessary in order to implement the new process. A new interpretation need merely take place.

DETAILED DESCRIPTION OF THE INVENTION

Figure 1:
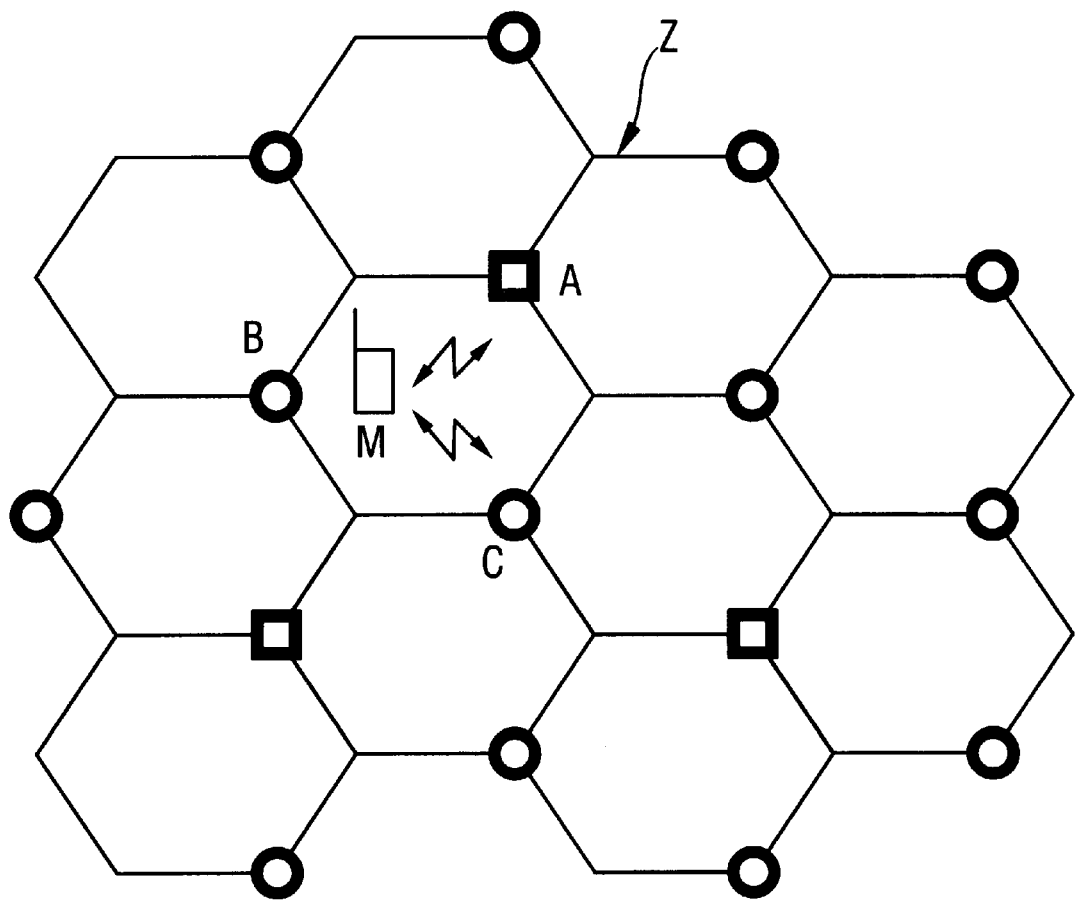
FIG. 1 shows the structure of a cellular mobile radio system according to the present invention.

In general, the method of the invention is based on the possibility under the GSM for very specific cells to be blocked for the traffic. "Blocked" means that when one mobile station is connected, it recognizes which base station is "free" and which base station cannot be used for the time being.

Each base station for this purpose regularly sends out system information over a broadcast control channel (BCCH) which is received and evaluated by the mobile station. Under this information for instance the parameters Cell_Bar Quality and Cell_Bar Access are included which describe whether access can be had to the corresponding base station and with what priority.

In accordance with the invention an additional information is added, namely an additional parameter, referred to, for instance, as GPRS_Supported, which indicates whether the base station in question supports a given additional service, for instance the new GPRS service.

This above-mentioned different or additional information is received and evaluated by the mobile station and in combination with the system information provides information to the mobile station indicating whether the base station in question is blocked, GPRS supported, and/or supporting additional further services.

The Cell_Bar Control File which contains the parameters Cell_Bar Qualify and Cell_Bar Access determines the function of the cell or of the base station supplying the cell. If, for instance, the base station is blocked by setting the parameter Cell_Bar Access and, in addition, the parameter Cell_Bar Qualify is set, then the cell is actually blocked for access to the mobile stations, but can, in principle, if no other "free" cell is present permit as a last opportunity access to a mobile station. By the Cell_Bar Qualify parameter, therefore, a low access priority is indicated compared with the mobile station. This is a cell having a Lower-Priority-Access.

The parameter Cell_Bar Access expresses whether a cell is open or blocked. For example, there are mobile stations which support GMS-phase one and GMS-phase two. A GMS-phase one mobile station in principle sees only the parameter Cell_Bar Access and therefore knows whether or not the cell is open. If it is not, then the GMS-phase-one mobile station cannot be booked at all in this cell. The GMS-phase-two mobile station, however, also still sees the parameter Cell_Bar Qualify and recognizes at first, on the basis of the Cell_Bar Access, that the cell is blocked, but also recognizes from the set parameter Cell_Bar Qualify that theoretically access can be had to this cell. First, the mobile station, however, must check, via the other cells which can be reached, whether it can use any of them before a cell of "lower" priority is used.

In accordance with the invention, the mobile station now also evaluates the new parameter GPRS_Supported. If now, for instance, the cell is blocked by the setting of the parameter Cell_Bar Access, and the Cell_Bar Qualify parameter is not set but the parameter GPRS_Supported is set, and therefore logically high, then this means the cell is blocked. However, this is only valid for all regular services and not for the additional service GPRS. In this case, the cell is a GPRS-only cell, which supports only the addition service GPRS.

The method of the invention supports not only the service known for instance as GPRS but also other services which will come into existence come in the future.

This means that a hierarchical network structure is created in the form of a multi-layer network. Up to now GSM can, for instance, be referred to as a single-layer network which supports the normal GSM service.

In accordance with the invention, there is now in addition a second layer which possibly supports only GPRS or other additional services.

Later services are associated to a third layer, etc., which can then support other additional services. And the mobile station on the basis of the system information sent out over the base station automatically recognizes which services or which service layers are supported by the corresponding cell or base station.

For operation in such a hierarchical GSM network, mobile stations of different classes are provided.

A mobile station Class A is a mobile station which supports in parallel two services, for instance a traditional service and an additional service. These mobile stations have two transceivers and can simultaneously operate one additional service and one standard service, for instance a speech connection. This means that if, for instance, a laptop is connected to a Class A mobile station, data transfer and phoning can be effected simultaneously.

A mobile station Class B can use the services sequentially. That is, either speech traffic or an additional service can be used. This means that if the mobile station is used for an additional service, for instance GPRS, the user is informed—if for instance conversation is going on—and then the subscriber can decide whether he wants to receive the conversation or not. If the conversation is taken up, the GPRS must terminate the session.

A mobile station Class C is an "only" GPRS mobile station which supports only the GPRS service or other additional services.

The advantage of the invention is that the network operator can implement a new service and thus divide the capacity of the network dynamically between the previous services and the new service in the manner that the functions of the base stations are pre-established accordingly. For example, every second line can support only the new additional service while the other cells are, as before, competent for the previous services. This opens up the possibility of adapting the mobile radio network dynamically to the traffic being received with the additional service or to adapt to the traffic to be expected.

The invention will now be described in further detail with reference to FIG. 1 and two tables.

In this connection, one starts from the implementation of the additional service already mentioned, General Packet Radio Service (GPRS) in a GSM mobile radio network. GPRS is a packet data service which makes it possible to divide each of the 8 TDMA (time division multiple access) time slots of a GSM frequency again to up to 8 channels and transmit packet-oriented data to them.

Of course, other additional services can be connected in accordance with the same principle. Only the designation of the additional parameter for the new service will change in this connection.

Table 1 shows the instantaneous state of the art and therefore the present art of the cell selection parameters consisting substantially of two bits: Cell_Bar Qualify and Cell_Bar Access.

Depending on the state of the bits, i.e., whether the bit is set or not, the cell signal indicates that you are either "open" for all services, or "blocked" for all services, or only limited, i.e. available only in exceptional cases.

| Cell_Bar Qualify | Cell_Bar Access | Priority for Cell Selection | Status for Cell Selection |
|---|---|---|---|
| 0 | 0 | normal | normal |
| 0 | 1 | blocked | blocked |
| 1 | 0 | low | normal |
| 1 | 1 | low | normal |

In accordance with the invention, a further bit, here designated GPRS_Supported, is now added to the previous two parameters. This can be noted from Table 2. The signaling sent out periodically by the base station with regard to its condition therefore contains the additional parameter GPRS_Supported which can receive and evaluate the base stations which support the additional service GPRS. The base stations know on the basis of the previous and additionally received signalizing information which services support and decide the corresponding base station or radio cell in connection with which base station a booking is possible and meaningful.

| GPRS_Supported | Cell_Bar Qualify | Cell_Bar Access | Priority for Cell Selection | Status for Cell Selection |
|---|---|---|---|---|
| L | 0 | 0 | normal | normal (1) |
| L | 0 | 1 | blocked | blocked (2) |
| L | 1 | 0 | low | normal (3) |
| L | 1 | 1 | low | normal (4) |
| H | 0 | 0 | normal | normal (5) |
| H | 0 | 1 | blocked | blocked (6) |
| H | 1 | 0 | low | normal (7) |
| H | 1 | 1 | low | normal (8) |

The corresponding bit combinations of the individual cells of Table 2 and their meaning are explained below:
(1): Status of the cell is normal. The cell is accessible for all services, but not for GPRS.
(2): Status of the cell is "blocked". This applies to all services including GPRS.
(3): Status of the cell is normal. The cell has low priority for all services. GPRS is not supported.
(4): Status of the cell is normal. The cell has local priority for all services. GPRS is not supported.
(5): Status of the cell is normal. The cell is accessible for all services, including GPRS.
(6): Status of the cell is "blocked". This applies to all services, but not however to GPRS. GPRS is accessible.
(7): Status of the cell is normal. The cell has low priority for all services, including GPRS.
(8): Status of the cell is normal. The cell has low priority for all services, including GPRS.

The network operator can now set the parameters in accordance with the selection possibilities (1)–(8) in accordance with the desired function of the base station.

FIG. 1 shows diagrammatically the structure of a cellular mobile radio system having a plurality of hexagonal radio cells Z. Each radio cell Z is supplied, for example, by in each case three base stations A, B, C arranged on the cell edge.

In accordance with the invention, now not every base station of a cell supports all GSM services offered. For example, the base station A supports only the GPRS service, while the base stations B and C support exclusively the other GSM services.

The system information sent out periodically by the base stations B and C therefore contains no GPRS_supported parameter or the GPRS_parameter bit is not set. In accordance with Table 2, the system information sent out by base stations B and C can read as follows: GPRS_Supported=L, Cell_Bar Qualify=0, Cell_Bar Access=0.

Base station A, on the other hand, sends out the GPRS-Parameter or the GPRS-bit is set. The system information sent out may read: GPRS_Supported=H, Cell_Bar Qualify=0, Cell_Bar Access=1.

A mobile station M present in the supply region of the base stations A, B and C receives the system information from, for instance, the base stations A and C and, in the event that it wants to use a GPRS service, will book it at base station A instead of base station C.

Each network operator is free, independently of service-specific incoming traffic in the corresponding cells or in the entire network in case of need in very specific cells to permit only very specific services in order thereby dynamically to control the access behavior of the mobile stations.

Legends

FIG. 1

○ Base station, supports only "normal" service

□ Base station, supports only GPRS

What is claimed is:

1. A method for operating a cellular mobile radio system having a plurality of radio cells, each radio cell being supplied by at least one base station, comprising the steps of:

assigning each base station to one of a plurality of service layers, wherein each service layer supports one of the group consisting of no services, only normal services, only additional services, and all services offered;

periodically transmitting system information and additional system information from each base station which are received and evaluated by mobile stations present in a supply region of the base station to indicate which service layer is presently supported by the corresponding base station;

determining by each mobile station, from the system information and from the additional system information, which service layer each base station supports; and automatically selecting, by each mobile station, an optimum base station supporting a desired service layer.

2. The method according to claim 1, wherein the cellular mobile radio system is a Global System for Mobile Communications (GSM) network.

3. The method according to claim 1, wherein the system information comprises a Cell_Bar Quality parameter and a Cell_Bar Access parameter.

4. The method according to claim 3, wherein the additional system information is a parameter which is designated (GPRS_Supported).

5. The method according to claim 3, wherein certain base stations support only the normal services and other base stations support only the additional services.

6. The method according to claim 3, wherein the additional system information is a parameter which is designated (GPRS_Supported), and wherein certain base stations support only previous services and other base stations support only the additional services.

7. The method according to claim 3, wherein the base stations, which support the additional services, are controlled directly by an additional service control node.

8. The method according to claim 3, wherein:

the additional system information is a parameter which is designated (GPRS_Supported), and the base stations, which support the additional services, are controlled directly by an additional service control node.

9. The method according to claim 3, wherein:

certain base stations support only the normal services and other base stations support only the additional services, and the base stations, which support the additional services, are controlled directly by an additional service control node.

10. The method according to claim 3, wherein:

the additional system information is a parameter which is designated (GPRS_Supported), certain base stations support only the normal services and other base stations support only the additional services, and the base stations, which support the additional services, are controlled directly by an additional service control node.

11. The method according to claim 1, wherein the additional system information is a parameter which is designated (GPRS_Supported).

12. The method according to claim 1, wherein certain base stations support only the normal services and other base stations support only the additional services.

13. The method according to claim 1, wherein the base stations, which support the additional services, are controlled directly by an additional service control node.

* * * * *